United States Patent
Yoshikawa

(10) Patent No.: US 11,687,823 B2
(45) Date of Patent: Jun. 27, 2023

(54) AUTOMATED SWITCHING OF A STRATEGY FOR SELECTION OF DATA ELEMENTS TO BE LABELED BASED ON LABELING PROGRESS

(71) Applicant: International Business Machines Corporation, Armonk, NY (US)

(72) Inventor: Katsumasa Yoshikawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 15/666,398

(22) Filed: Aug. 1, 2017

(65) Prior Publication Data
US 2019/0042975 A1 Feb. 7, 2019

(51) Int. Cl.
*G06N 20/00* (2019.01)
*G06N 7/01* (2023.01)
*G06F 16/901* (2019.01)

(52) U.S. Cl.
CPC ......... *G06N 20/00* (2019.01); *G06F 16/9024* (2019.01); *G06N 7/01* (2023.01)

(58) Field of Classification Search
CPC combination set(s) only.
See application file for complete search history.

(56) References Cited

U.S. PATENT DOCUMENTS

| 6,523,017 | B1* | 2/2003 | Lewis | G06N 20/00 706/12 |
| 8,620,842 | B1* | 12/2013 | Cormack | G06F 16/93 706/12 |
| 9,058,327 | B1 | 6/2015 | Lehrman et al. | |
| 9,269,053 | B2 | 2/2016 | Naslund et al. | |
| 2003/0233369 | A1* | 12/2003 | Sassano | G06K 9/6269 707/999.102 |
| 2007/0005340 | A1* | 1/2007 | Goutte | G06F 16/355 704/9 |
| 2008/0147574 | A1* | 6/2008 | Chidlovskii | G06F 16/35 706/12 |
| 2009/0252404 | A1* | 10/2009 | Lecerf | G06K 9/6254 382/154 |

(Continued)

OTHER PUBLICATIONS

Zhu et al., "Semi-Supervised Learning Using Gaussian Fields and Harmonic Functions," Proceedings of the Twentieth International Conference on Machine Learning (ICML-2003) (Year: 2003).*

(Continued)

*Primary Examiner* — Kakali Chaki
*Assistant Examiner* — Kevin L. Smith
(74) *Attorney, Agent, or Firm* — Richard B. Thomas

(57) ABSTRACT

A computer-implemented method for outputting a data element to a user for an operation by the user to give a label to plural data elements, includes: selecting the data element by either one of a first strategy and a second strategy, the first strategy being a strategy for selecting a data element which has been predicted with a low confidence level, the second strategy being a strategy for selecting a data element which has been predicted with a high confidence level; outputting the selected data element so as for a user to give a label to the selected data element; and switching between the first strategy and the second strategy depending on a progress degree of labeling by the user.

19 Claims, 6 Drawing Sheets

(56) References Cited

U.S. PATENT DOCUMENTS

| | | | | |
|---|---|---|---|---|
| 2010/0312725 | A1* | 12/2010 | Privault | G06Q 10/10 |
| | | | | 706/12 |
| 2015/0012448 | A1* | 1/2015 | Bleiweiss | G06Q 50/18 |
| | | | | 705/311 |
| 2015/0055867 | A1 | 2/2015 | Wade et al. | |
| 2015/0339298 | A1 | 11/2015 | Morimoto et al. | |
| 2016/0371261 | A1* | 12/2016 | Cormack | G06F 16/23 |
| 2017/0116519 | A1* | 4/2017 | Johnson | G06N 3/08 |

OTHER PUBLICATIONS

Grossman et al., "A Tour of Technology-Assisted Review," (ABA 2015) (Year: 2015).*

Cormack et al., "Scalability of Continuous Active Learning for Reliable High-Recall Text Classification," CIKM'16 (Oct. 2016) (Year: 2016).*

Andreas Vlachos, "A Stopping Criterion for Active Learning," Science Direct (2008) (Year: 2008).*

Zhu et al., "Confidence-Based Stopping Criteria for Active Learning for Data Annotation," ACM (2010) (Year: 2010).*

Laws et al., "Stopping Criteria for Active Learning of Named Entity Recognition," Int'l Conf. on Computational Linguistics (2008) (Year: 2008).*

Bloodgood et al., "A Method for Stopping Active Learning based on Stabilzing Predictions and the Need for User-Adjustable Stopping," arXiv (2014) (Year: 2014).*

Cormack et al., "Evaluation of Machine-Learning Protocols for Technology-Assisted Review in Electronic Discovery," SIGIR '14: Proceedings of the 37th International ACM SIGIR Conference on Research & Development in Informal Retrieval, Jul. 2014, pp. 153-162, ACM, New York, NY. DOI: 10.1145/2600428.2609601.

Monroy et al., "Using Graphs for Shallow Question Answering on Legal Documents," In Gelbukh et al. (eds) MICAI 2008: Advances in Artificial Intelligence, Lecture Notes in Computer Science, vol. 5317, 2008, pp. 165-173, Springer, Berlin, Heidelberg.

Song et al., "Combining active learning and semi-supervised learning techniques to extract protein interaction sentences," BMC Bioinformatics, 2011, vol. 12 (Suppl 12):S4, pp. 1-11. DOI: 10.1186/1471-2105-12-S12-S4.

Tomanek et al., "Semi-Supervised Active Learning for Sequence Labeling," ACL '09: Proceedings of the 47th Annual Meeting of the ACL and the 4th IJCNLP of the AFNLP, Aug. 2009, pp. 1039-1047.

Winkels, R. (Editor), Workshop: "Network Analysis in Law," NAiL2013 Proceedings, Jun. 2013, 90 pages.

Yoshikawa et al., "Graph-based Legal Document Similarity Search," Ninth International Workshop on Juris-Informatics (JURISIN 2015), Nov. 2015, pp. 1-14. http://research.nii.ac.jp/~ksatoh/jurisin2015/.

Zhu et al., "Semi-Supervised Learning Using Gaussian Fields and Harmonic Functions," Proceedings of the Twentieth International Conference on Machine Learning (ICML-2003), pp. 1-8.

* cited by examiner

AUTOMATED SWITCHING OF A STRATEGY FOR SELECTION OF DATA ELEMENTS TO BE LABELED BASED ON LABELING PROGRESS

BACKGROUND

The present disclosure relates to the selection of a data element to be labeled.

Recently, various techniques have been developed for the selection of a data element to be labeled, for example, in an active learning device. An active learning device uses active learning, which is a type of supervised learning for machines. In active learning, a data element is given a label by a human, and learning is performed using the selected data element.

SUMMARY

According to an embodiment of the present disclosure, there is provided a computer-implemented method for selecting a data element to be labeled. The method includes selecting the data element by either one of a first strategy and a second strategy. The first strategy is a strategy for selecting a data element which has been predicted with a low confidence level. The second strategy is a strategy for selecting a data element which has been predicted with a high confidence level. The method includes outputting the selected data element so as for a user to give a label to the selected data element. The method includes switching between the first strategy and the second strategy depending on a progress degree of labeling by the user.

According to another embodiment of the present disclosure, there is provided a system for selecting a data element to be labeled. The system includes a processor and a memory coupled to the processor. The memory includes program instructions. The program instructions are executable by the processor to cause the processor to perform the aforementioned method.

According to yet another embodiment of the present disclosure, there is provided a computer program product for selecting a data element to be labeled. The computer program product includes a computer readable storage medium having program instructions embodied with the computer readable storage medium. The program instructions are executable by a computer to cause the computer to perform the aforementioned method.

DETAILED DESCRIPTION

Hereinafter, exemplary embodiments of the present disclosure will be described in detail with reference to the attached drawings. It should be noted that the present disclosure is not limited to these exemplary embodiments discussed below, but may be implemented with various modifications within the scope of the present disclosure.

In some embodiments the employment of active learning can reduce the workload of a user whereby the user is only required to give labels to a small portion of the data elements instead of the entirety of the data elements. The exemplary embodiments may prevent degradation of the learning performance even when the user gives labels to a small number of the data elements.

The following is an example implementation of the present disclosure for e-discovery which is a key process in lawsuits. In this example the data elements are assumed to be documents owned by a defendant. Further, in this example, the above labels are assumed to indicate whether or not the documents are to be used as responses to a plaintiff's request in discovery. Hereinafter, such characteristics are referred to as being "responsive". Furthermore, in this example, the above user is assumed to be a reviewer who is an expert for giving the labels to the documents. While the present disclosure discusses labeling and active learning in terms of e-discovery, the present disclosure can be implemented on any data set where individual elements of the data set are to be classified or categorized by a human according to a learnable categorization or classification system.

Figure 1:
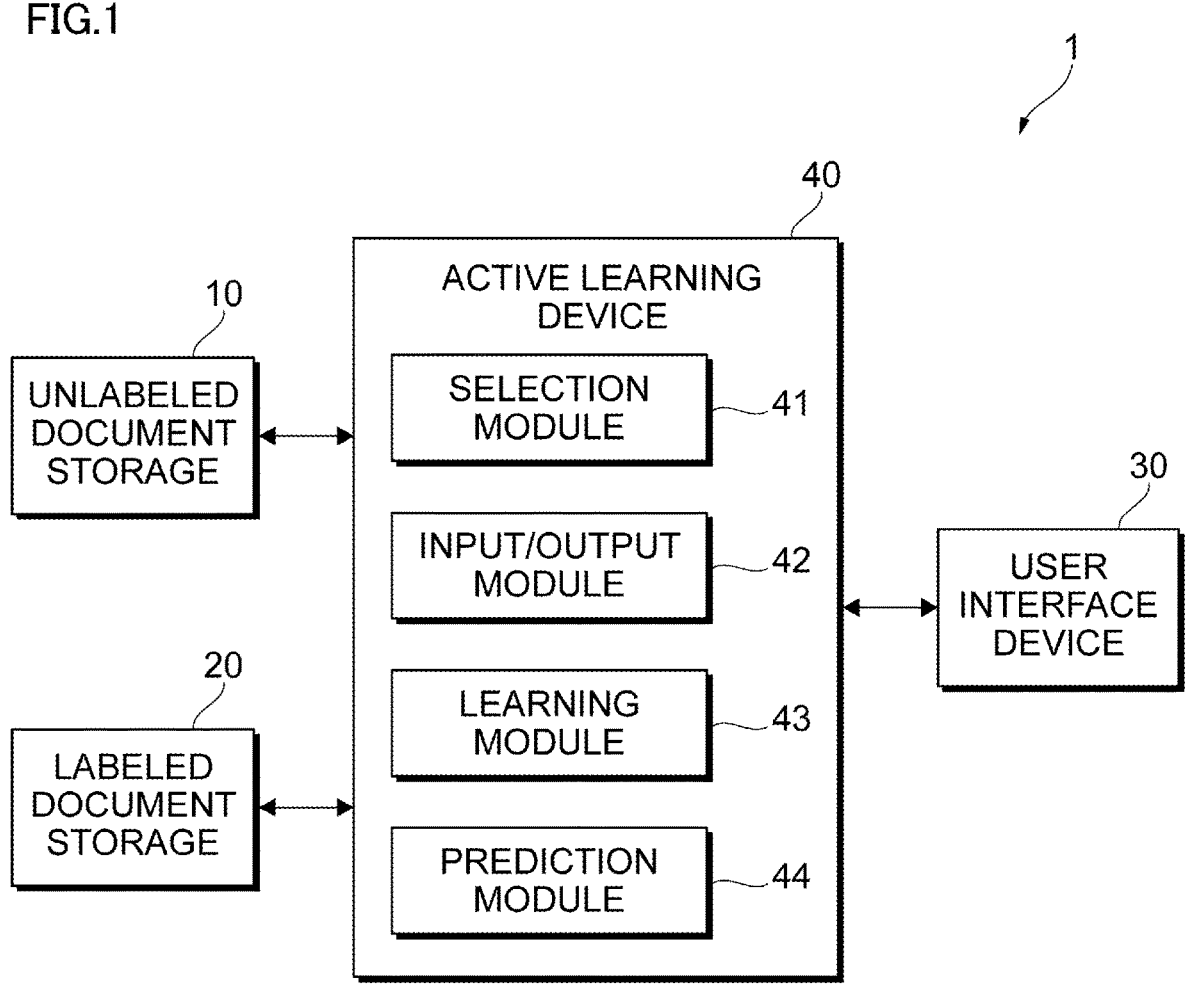
FIG. 1 depicts a block diagram of a document labeling system according to a preferred exemplary embodiment of the present disclosure.

Referring now to FIG. 1, a block diagram illustrating a document labeling system 1 to which an exemplary embodiment is applied is provided. As shown in FIG. 1, the document labeling system 1 includes an unlabeled document storage 10, a labeled document storage 20, a user interface device 30, and an active learning device 40.

The unlabeled document storage 10 stores the documents in a state of being unlabeled. In other words, the unlabeled document storage 10 may store the documents which have not been reviewed by the reviewer, and which are targets of prediction by the active learning device 40. After the prediction, the unlabeled document storage 10 may further store confidence scores. Note that each of the confidence scores may be assigned to corresponding one of the documents by the active learning device 40. The confidence scores may indicate a confidence level of a prediction by the active learning device 40 that the corresponding one of the documents is responsive.

The unlabeled document storage 10 may store the documents in a sorted state based on the confidence scores. That is, the documents can be sorted into three types of documents. The first type of documents are documents predicted to be responsive (hereinafter this type of documents are referred to as "responsive documents"). The second type of documents are documents predicted to be not responsive (hereinafter this type of documents are referred to as "non-responsive documents"). The third type of documents are documents which are uncertain whether they are responsive documents or non-responsive documents (hereinafter this type of documents are referred to as "uncertain documents"). It should be noted that the above example lists three types of documents, however, any number of different types can be present.

For example, assume a case where the confidence scores take values of between 1 (indicating the highest likelihood of being responsive) and −1 (indicating the lowest likelihood of being responsive). In this case, documents with confidence scores more than a predetermined positive value are defined as the responsive documents. Similarly, documents with confidence scores less than a predetermined negative value are defined as the non-responsive documents. Furthermore, documents with confidence scores less than the predetermined positive value and more than the predetermined negative value may be defined as the uncertain documents. However, other values can be used for the confidence scores.

The labeled document storage 20 may store the documents in a state of being labeled. Specifically, the labeled document storage 20 stores the documents and labels given to the documents in association with each other. In other words, the labeled document storage 20 may store the documents which have been reviewed by the reviewer, and which are to be targets of learning by the active learning device 40.

The user interface device 30 is used by the reviewer to review a document selected by the active learning device 40, and to give a label to the document. The label may indicate that the document is a responsive document or a non-responsive document. The user interface device 30 may include an input device such as a mouse and an output device such as a display device.

The active learning device 40 performs active learning. Specifically, the active learning device 40 includes a selection module 41, an input/output module 42, a learning module 43, and a prediction module 44. The active learning device 40 performs the active learning using functions of these modules described below.

The selection module 41 may select one document from the documents stored in the unlabeled document storage 10. Specifically, the selection module 41 can select one document using either one of two sampling strategies. The selection can be determined based on information indicating which of the two sampling strategies should be applied. An example of a method for determining which of the two sampling strategies should be selected is described in greater detail with respect to FIG. 2.

One of the two sampling strategies is the least confidence strategy. The least confidence strategy is a strategy in which the selection module 41 selects one document with the least (e.g. lowest) confidence score. Assuming again that the confidence scores take values of between 1 (indicating the highest likelihood of being responsive) and −1 (indicating the lowest likelihood of being responsive), the least confidence score may be a confidence score having the least absolute value. By applying the least confidence strategy, precision of documents to be given the labels may improve. Note that, although the least confidence strategy is used in the exemplary embodiments, other strategies may be used. For example, another such strategy may be a strategy in which a document that was predicted to be labeled with a low confidence level by the prediction module 44 is outputted. These strategies illustrate an example of a first strategy.

The second sampling strategy is the most confidence strategy. The most confidence strategy is a strategy in which the selection module 41 selects one document with the most (e.g. highest) confidence score. Assuming again that the confidence scores take values of between 1 (indicating the highest likelihood of being responsive) and −1 (indicating the lowest likelihood of being responsive), the most confidence score is a confidence score having the most absolute value. By applying the most confidence strategy, recall of documents to be labeled is improved. Note that, although the most confidence strategy is used in the exemplary embodiments, other strategies may be used. For example, another such strategy may be a strategy in which a document having been predicted to be given the label with a high confidence level by the prediction module 44 is outputted. These strategies illustrate an example of a second strategy.

The selection module 41 deletes the selected document from the documents stored in the unlabeled document storage 10 upon the labeling of the selected document as either responsive or non-responsive. The selection module 41 can delete the document using any method for removing documents from a storage system.

The input/output module 42 may output, to the user interface device 30, the document selected by the selection module 41. Further, the input/output module 42 may accept a label given to the selected document in response to the reviewer's operation of the user interface device 30.

The learning module 43 may store, in the labeled document storage 20, the selected document and the label given to the selected document in association with each other. Further, the learning module 43 may learn a classification model based on a correspondence between the documents and the labels given to the documents stored in the labeled document storage 20. In other words, the learning module 43 may learn what features the responsive documents and the non-responsive documents have.

The prediction module 44 predicts, based on the classification model, whether or not each of the documents stored in the unlabeled document storage 10 is likely to be responsive. Then, the prediction module 44 may assign confidence scores where each score indicates a confidence level of a prediction that corresponding one of the documents is responsive. For example, logistic regression may be used as the classification model to predict the confidence scores. However, any prediction method can be used so long a confidence score is calculated.

Figure 2:
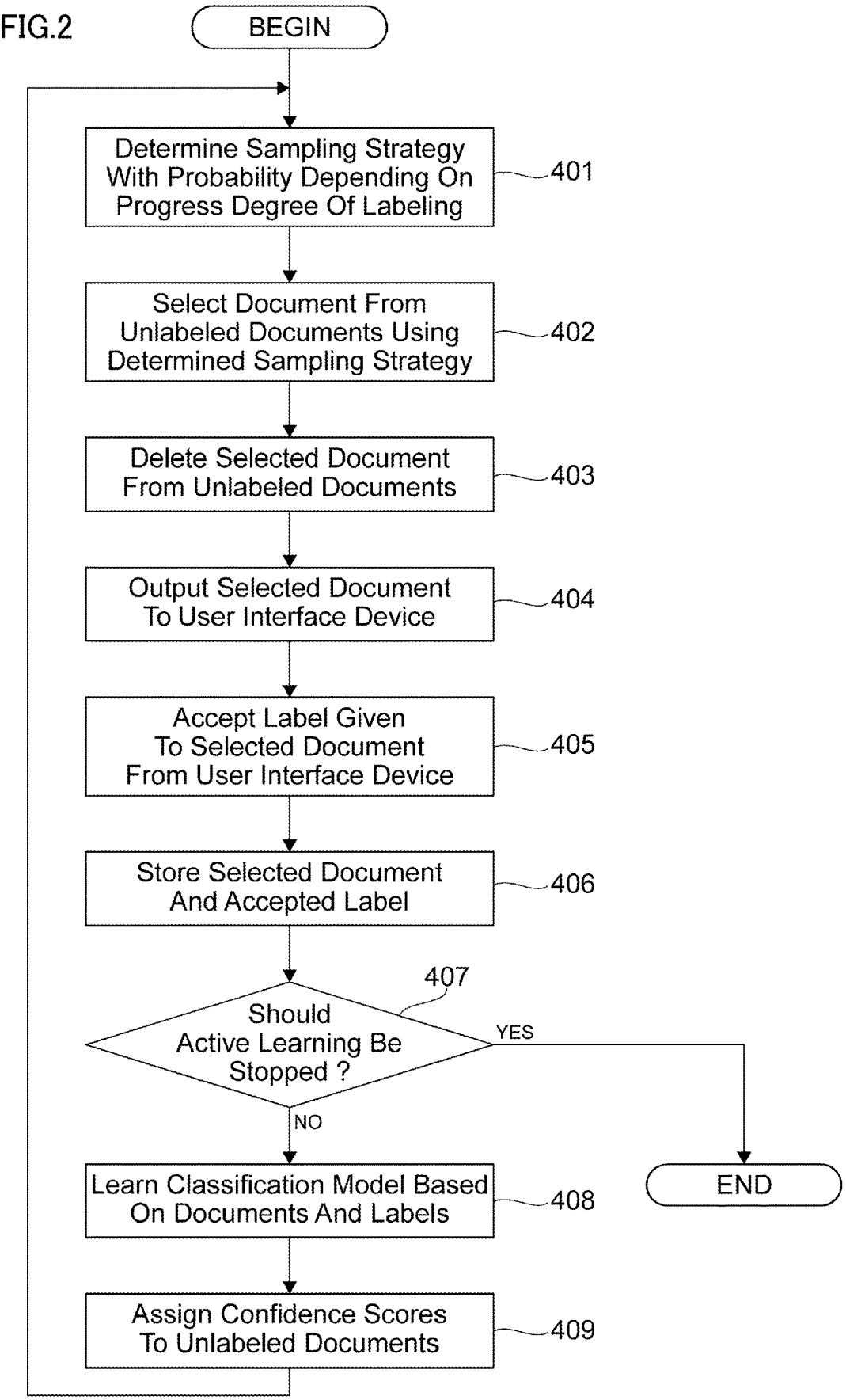
FIG. 2 depicts a flowchart representing an example of operations of an active learning device constituting the document labeling system according to the preferred exemplary embodiment.

Next, operations of the document labeling system 1 according to an exemplary embodiment are described. Specifically, FIG. 2, is a flowchart illustrating an example of the operations of the active learning device 40 according to illustrative embodiments.

The process begins by determining one of two sampling strategies. This is illustrated at step 401. The selection module 41 can determine the sampling strategy, namely the least confidence strategy and the most confidence strategy, with a probability depending on a progress degree of labeling by the reviewer (step 401). Therefore, the applied sampling strategy may be switched between the first strategy and the second strategy depending on the progress degree of the labeling by the reviewer. For example, the progress degree of the labeling by the reviewer may be the number of reviews. The probability may be a probability that the least confidence strategy is applied, and may become lower as the number of reviews becomes larger. For example, the probability may be calculated by a formula such as $p=\emptyset/\sqrt{n}$, where p is a probability that the least confidence strategy is applied (i.e., a probability used at step 401), $\emptyset$ is a balancing factor, and n is the number of reviews. The balancing factor may be a factor balancing a probability that the least confidence strategy is applied and a probability that the most confidence strategy is applied. Following the selection of a strategy, the selection module 41 may select one document from the documents stored in the unlabeled document storage 10 using this determined sampling strategy (step 402). Note that, in the initial processing stage, the unlabeled document storage 10 stores no confidence score, and thus the selection module 41 may randomly select one document regardless of the confidence scores. Meanwhile, the selection module 41 may also delete the selected document from the documents stored in the unlabeled document storage 10 (step 403).

Next, the input/output module 42 may output the selected document to the user interface device 30 such as a display device (step 404). Thus, the selected document is displayed on the user interface device 30. The reviewer may review the selected document displayed on the user interface device 30. Then, the reviewer may give a label to the selected document. The label may indicate whether the selected document is a responsive document or a non-responsive document. In response to the reviewer's labeling, the input/output module 42 may accept the label given to the selected document from the user interface device 30 (step 405).

Subsequently, the learning module 43 stores, in the labeled document storage 20, the selected document and the accepted label in association with each other (step 406). Then, the learning module 13 may determine whether or not active learning should be stopped (step 407). The learning module 13 may determine to stop the active learning, for example, when any one of the following conditions is satisfied: (1) the type of the selected document predicted by the prediction module 44 is matched with the label given to the selected document by the reviewer continuously for more than a predetermined number of reviews; (2) the document predicted to be a responsive document is unlikely to be selected by the selection module 41 in comparison with a predetermined criteria; and/or (3) an accuracy rate of labeling by the reviewer (may be substituted by a matching rate between prediction by the prediction module 44 and the labeling by the reviewer) in the last several reviews is lower than a potential accuracy rate of labeling by the reviewer. If it is determined that the active learning should be stopped, the processing may be ended.

If, at step 407 it is determined that the active learning should not be stopped, the learning module 43 learns a classification model for classifying the documents into the responsive documents and the non-responsive documents based on the documents and the labels stored in the labeled document storage 20 (step 408). Thus, the prediction module 44 predicts whether or not each of the documents stored in the unlabeled document storage 10 is responsive based on the classification model. As a result of the prediction, the prediction module 44 assigns confidence scores where each score indicates a confidence level of the prediction, to each of the documents stored in the unlabeled document storage 10 (step 409). In some embodiments the confidence score is predicted for a subset of the documents in the unlabeled document store 10.

Figure 3:
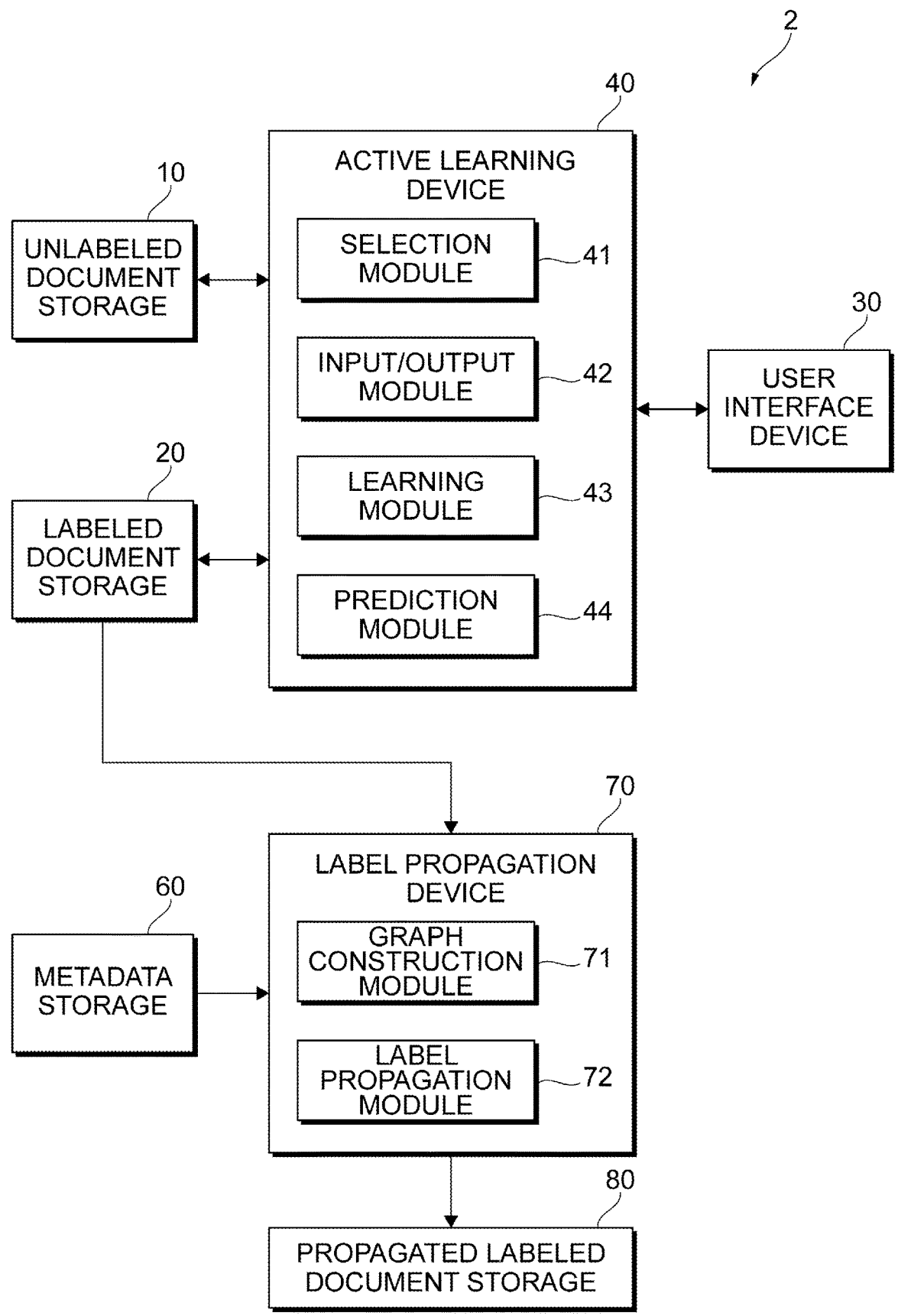
FIG. 3 depicts a block diagram of a document labeling system according to an alternative exemplary embodiment of the present disclosure.

FIG. 3 is a block diagram of a document labeling system 2 according to illustrative embodiments. As illustrated in FIG. 3, the document labeling system 2 includes an unlabeled document storage 10, a labeled document storage 20, a user interface device 30, an active learning device 40, a metadata storage 60, a label propagation device 70, and a propagated labeled document storage 80.

With respect to the unlabeled document storage 10, the labeled document storage 20, the user interface device 30, and the active learning device 40, the function and operation of these components is not discussed further. The function and operation of these components is substantially the same as discussed above with respect to FIG. 1.

The metadata storage 60 may store metadata related to the documents. Assuming that a document has been sent by e-mail, the metadata related to the document may include data about a sender of the e-mail, a receiver of the e-mail, a sending date/time of the e-mail, etc. This type of the metadata may be, for example, obtained from a header of the e-mail. Alternatively, assuming that a document was created using a word-processing software, the metadata related to the document may include data about a creator of the document, a creation date/time of the document, or the like. This type of the metadata may be, for example, obtained from property information of the document. For example, a document may be identified by a document ID, and the metadata of the document may be stored with the document ID in the metadata storage 60. However, other approaches for obtaining metadata for the documents can be used.

The label propagation device 70 may perform label propagation in which it propagates labels given to a small amount of documents by the reviewer to unlabeled documents. In detail, the label propagation device 70 may include a graph construction module 71 and a label propagation module 72.

The graph construction module 71 reads the labeled documents from the labeled document storage 20, and reads the metadata related to all documents from the metadata storage 60. Then, the graph construction module 71 constructs a human-oriented graph based on the labeled documents and the metadata related to all the documents.

The label propagation module 72 propagates labels to unlabeled documents according to the human-oriented graph constructed by the graph construction module 71.

The propagated labeled document storage 80 stores the documents each of which has a label given by the reviewer or propagated from a labeled document by the label propagation module 72.

Figure 4:
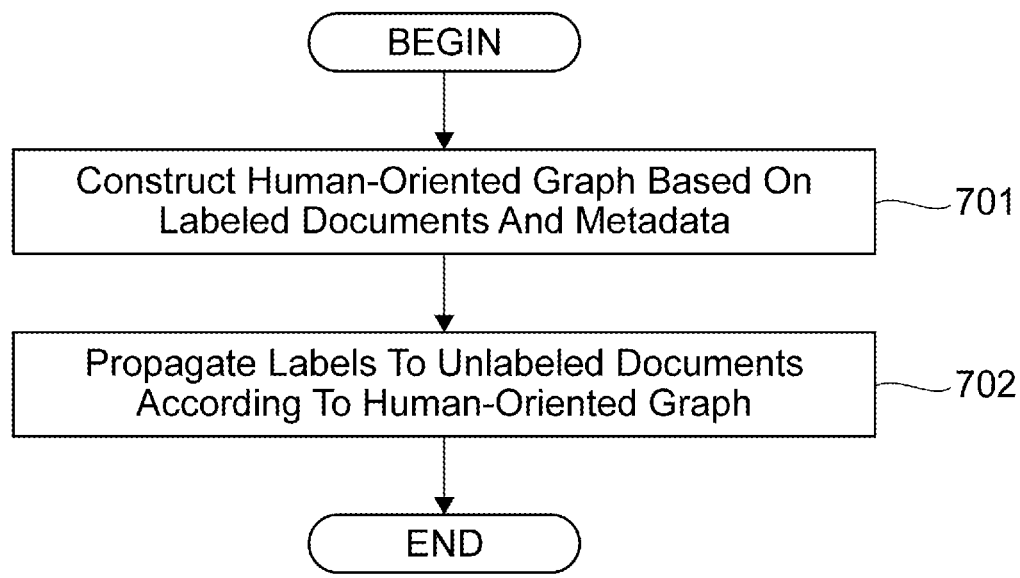
FIG. 4 depicts a flowchart representing an example of operations of a label propagation device constituting the document labeling system according to the alternative exemplary embodiment.

Next, operations of the document labeling system 2 according to the alternative exemplary embodiment are described with respect to FIG. 4. The operations of the active learning device 40 is omitted as it is substantially similar to the description provide in FIG. 2.

Referring to FIG. 4, a flowchart representing an example of the operations of the label propagation device 70 is described.

The graph construction module 71 constructs a human-oriented graph based on the labeled documents and the metadata related to all the documents (step 701). At this step, the labeled documents stored in the labeled document storage 20 and the metadata stored in the metadata storage 60 may be used. Specifically, the graph construction module 71 arranges plural nodes each representing corresponding one of all the documents. Then, the graph construction module 71 adds, to each of the plural nodes, an attribute indicating that the node represents a responsive document or an attribute indicating that the node represents a non-responsive document. Next, the graph construction module 71 arranges plural links connecting nodes representing documents created using a word-processing software by a creator. Then, the graph construction module 71 arranges plural links connecting nodes representing documents sent by e-mail from a sender and nodes representing documents created using a word-processing software by the sender, or connecting nodes representing documents sent by e-mail to a receiver and nodes representing documents created using a word-processing software by the receiver. Note that details of constructing the human-oriented graph are discussed later with respect to FIG. 5A. It should be noted that while the description of the generation of the human oriented graph is discussed in terms of email and word processing documents, the documents can be any type of document.

Next, the label propagation module 71 propagates labels to unlabeled documents according to the human-oriented graph (step 702). Such a label propagation may be performed, for example, by a generic algorithm such as the algorithm disclosed in "Zhu, X., Ghahramani, Z., and Lafferty, J.: Semi-Supervised Learning Using Gaussian Fields and Harmonic Functions, in Proceedings of the 20th International Conference on Machine Learning, pp. 912-919 (2003)". However, other algorithms can be used. Note that details of propagating the labels will also be described later with respect to FIG. 5B.

Figure 5A:
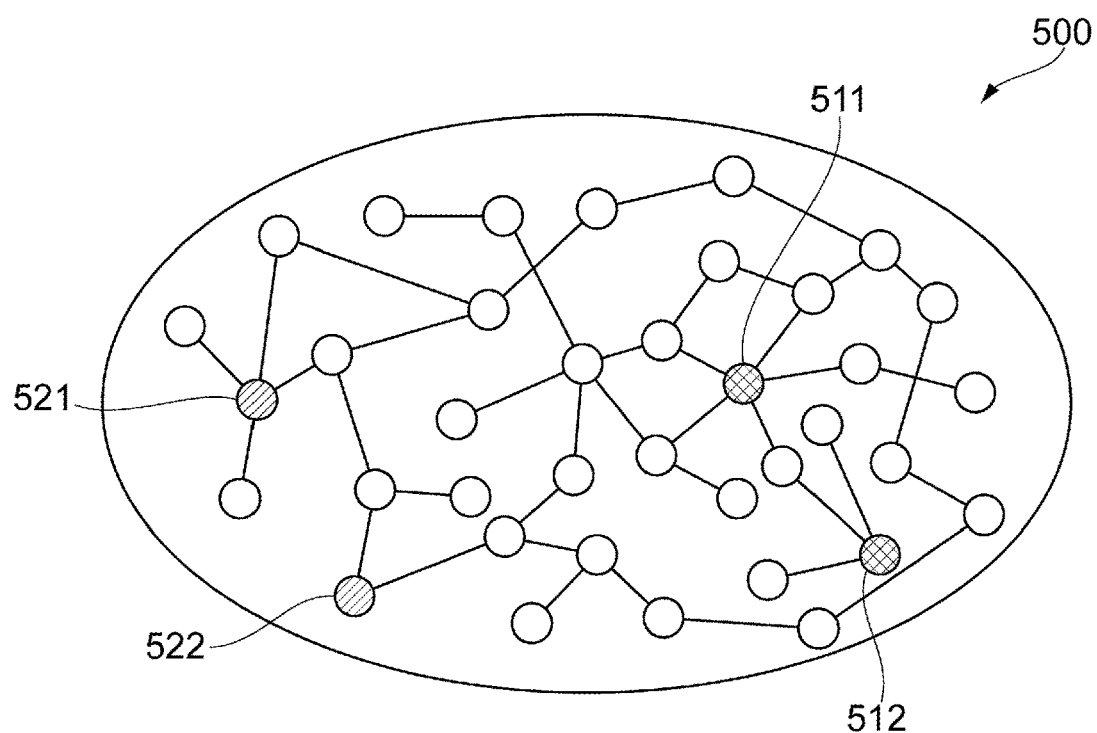
FIGS. 5A and 5B depict an example of a human-oriented graph and label propagation thereon, respectively.

Referring to FIG. 5A, an example of a human-oriented graph 500 constructed at step 701 is illustrated according to illustrative embodiments. As illustrated in the FIG. 5A, the human-oriented graph 500 may include plural nodes and plural links.

Each of the plural nodes may represent a document, and have the attribute indicating which of a responsive document and a non-responsive document the document is. For example, each of nodes 511 and 512 indicated by a cross-hatched circle is assumed to represent a responsive document. Further, each of nodes 521 and 522 indicated by an oblique-hatched circle is assumed to represent a non-responsive document. Furthermore, each of the other nodes indicated by a white circle is assumed to represent an unlabeled document.

In addition, each of the plural links connecting two nodes of the plural nodes may represent a similarity between two documents represented by the two different nodes. In this embodiment, the similarity is assumed to be a human-oriented similarity defined by human-oriented metadata of the two documents. The human-oriented similarity of the two documents may be similarity of the two documents focusing on one or more humans (or other entity) associated with the two documents. The human-oriented metadata of a document may be metadata focusing on a human associated with the document in particular among the metadata of the document stored in the metadata storage 60. For example, the human-oriented metadata may include a creator of the document created using a word-processing software, a sender and a receiver of the document sent by e-mail, and the like. That is, two nodes representing two documents created by a user A may be linked. Further, assuming that a user B has sent a document by e-mail to a user C, a node representing this document and each of a node representing a document created by the user B and a node representing a document created by the user C may be linked.

Figure 5B:
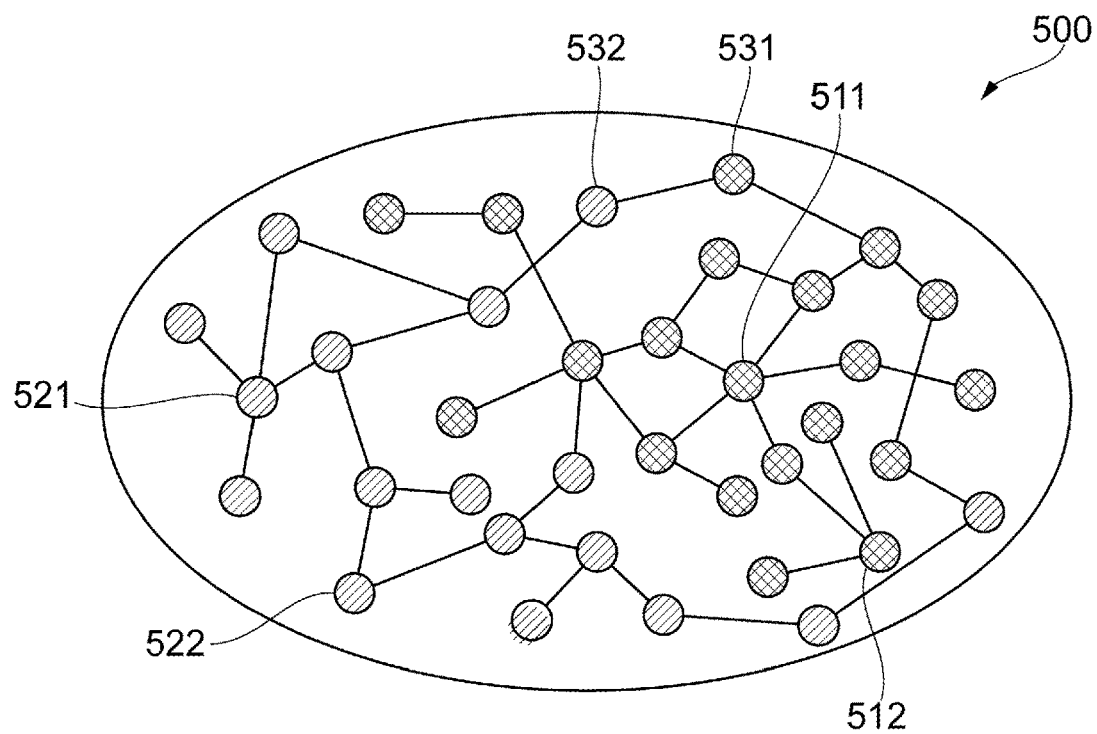

FIG. 5B, is an example of label propagation on the human-oriented graph 500 at step 702 according to illustrative embodiments. As illustrated in FIG. 5B, each node representing an unlabeled document may be switched to represent a responsive document, if the number of nodes from a node representing a document which is labeled a responsive document is less than the number of nodes from a node representing a document which is labeled a non-responsive document. Note that the document which is labeled a responsive document serves as one example of a claimed data element, and the unlabeled document serves as an example of a claimed second data element. Meanwhile, each node representing an unlabeled document may be switched to represent a non-responsive document if the number of nodes from a node representing a document which is labeled a non-responsive document is less than the number of nodes from a node representing a document which is labeled a responsive document. For example, a node 531 is assumed to be switched to represent a responsive document, because the number of nodes from the node 511 is three but the number of nodes from the node 521 is four. Meanwhile, a node 532 is assumed to be switched to represent a non-responsive document, because the number of nodes from the node 521 is three but the number of nodes from the node 511 is four.

Next, a hardware configuration of the active learning device 40 and the label propagation device 70 is described. Note that the active learning device 40 and the label propagation device 70 have the same hardware configuration, so the description will be for the hardware configuration of a computer 90.

Figure 6:
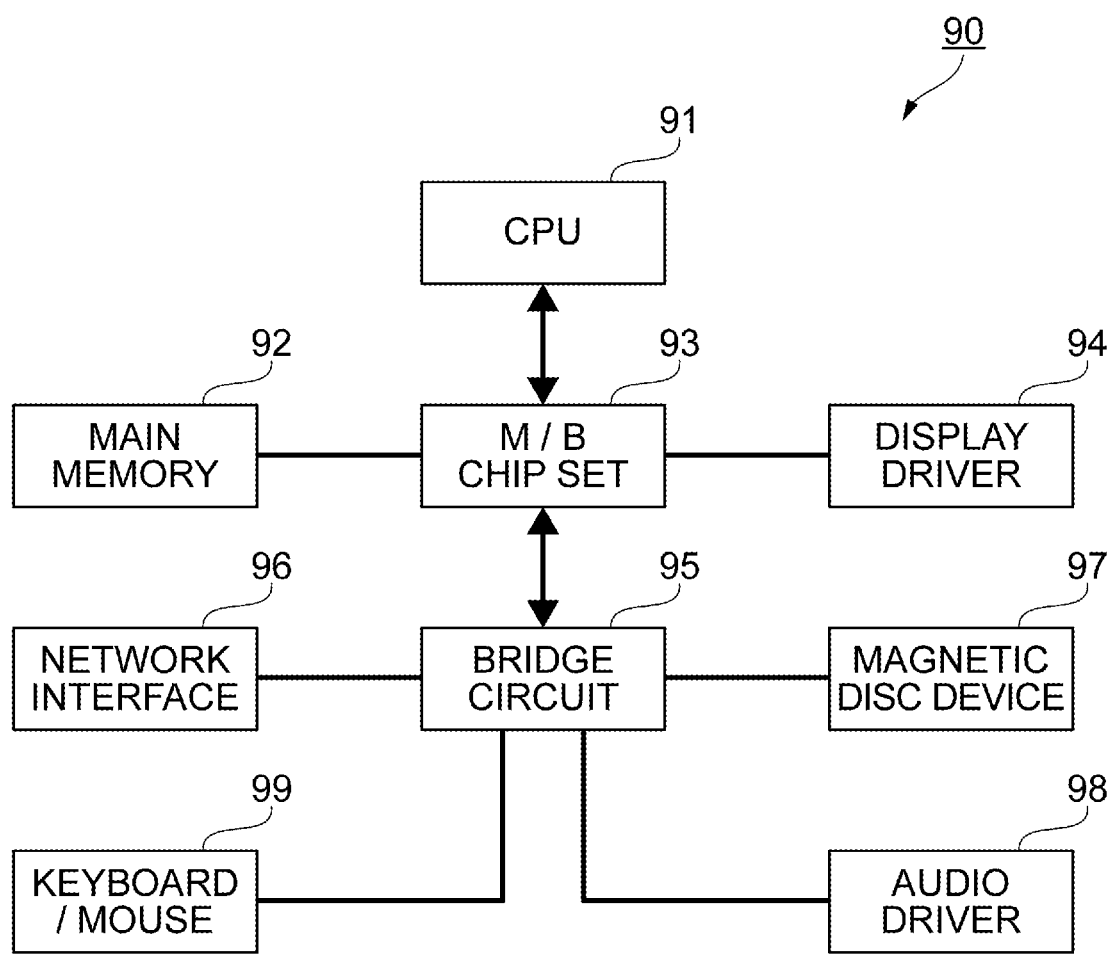
FIG. 6 depicts an example of a hardware configuration of a device constituting the document labeling system.

Referring now to FIG. 6, an example of a hardware configuration of the computer 90 is illustrated. As shown in FIG. 6, the computer 90 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 6, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting a data element to be labeled, the method comprising:
   employing classification learning of a model through active learning comprising:
   selecting a data element from a plurality of data elements, wherein each data element of the plurality of data elements is a document, by a first strategy, the first strategy being a strategy for selecting a data element which has been predicted with a low confidence level, the low confidence level at least partially subject to a prediction corresponding to one or more characteristics of the selected data element;
   outputting the selected data element to a user interface device so as for a user to give a label to the selected data element, thereby generating a labeled data element;
   learning the model with the labeled data element;
   predicting, subject to the model learning, the label for each unlabeled data element;
   assigning a confidence level of each prediction; and
   switching, automatically, between the first strategy and a second strategy depending on a progress degree of labeling by the user, the second strategy being a strategy for selecting a data element which has been predicted with a high confidence level, the high confidence level at least partially subject to the predicting; and stopping, automatically, at least partially subject to the predicting, all active learning processing comprising:

determining that a matching rate between data element predictions and user data element labeling is lower than a potential accuracy rate of labeling by the user.

2. The method of claim 1, wherein the progress degree of the labeling by the user is a number of reviews, each review being the labeling by the user.

3. The method of claim 1, wherein the switching includes switching using a probability that the data element is selected by the first strategy, and the probability is set to have a property of becoming lower as the progress degree of the labeling by the user becomes higher.

4. The method of claim 1, further comprising propagating the label from one data element to another data element using a human-oriented similarity between the one data element and the another data element, the one data element being the data element which has been given the label, the another data element being the data element which has not been given the label.

5. The method of claim 4, wherein the human-oriented similarity is a similarity focusing on one or more humans relating to the one data element and the another data element.

6. The method of claim 4, further comprising:

constructing a graph including a plurality of nodes and a plurality of links each of which connects corresponding two nodes of the plurality of nodes, each of the plurality of nodes representing the data element, each of the plurality of links representing the human-oriented similarity between two data elements represented by the corresponding two nodes, wherein the propagating further includes specifying the human-oriented similarity by referring to the graph.

7. The method of claim 1, wherein the automatic stopping of the active learning processing comprises:

matching the predicted label of each data element with each respective label given to the data element by the user continuously for more than a predetermined number of reviews.

8. The method of claim 1, wherein the automatic stopping of the active learning processing comprises:

determining that a data element predicted to include the one or more characteristics is unlikely to be selected.

9. A system for outputting a data element to a user for an operation by the user to give a label to a plurality of data elements, the system comprising:

a processor; and a memory coupled to the processor, wherein the memory comprises program instructions executable by the processor to cause the processor to perform a method comprising:

employing classification learning of a model through active learning comprising:

selecting a data element from a plurality of data elements, wherein each data element of the plurality of data elements is a document, by a first strategy, the first strategy being a strategy for selecting a data element which has been predicted with a low confidence level, the low confidence level at least partially subject to a prediction corresponding to one or more characteristics of the selected data element;

outputting the selected data element so as for a user to give a label to the selected data element, thereby generating a labeled data element;

learning the model with the labeled data element;

predicting, subject to the model learning, the label for each unlabeled data element;

assigning a confidence level of each prediction; and switching, automatically, between the first strategy and a second strategy depending on a progress degree of labeling by the user, the second strategy being a strategy for selecting a data element which has been predicted with a high confidence level, the high confidence level at least partially subject to the predicting; and stopping, automatically, at least partially subject to the predicting, all active learning processing comprising:

determining that a matching rate between data element predictions and user data element labeling is lower than a potential accuracy rate of labeling by the user.

10. The system of claim 9, wherein the progress degree of the labeling by the user is a number of reviews, each review being the labeling by the user.

11. The system of claim 9, wherein the switching includes switching using a probability that the data element is selected by the first strategy, and the probability is set to have a property of becoming lower as the progress degree of the labeling by the user becomes higher.

12. The system of claim 9, wherein the method further comprises propagating the label from one data element to another data element using a human-oriented similarity between the one data element and the another data element, the one data element being the data element which has been given the label, the another data element being the data element which has not been given the label.

13. The system of claim 12, wherein the method further comprises:

constructing a graph including a plurality of nodes and a plurality of links each of which connects corresponding two nodes of the plurality of nodes, each of the plurality of nodes representing the data element, each of the plurality of links representing the human-oriented similarity between two data elements represented by the corresponding two nodes; and the propagating further includes specifying the human-oriented similarity by referring to the graph.

14. The system of claim 9, wherein the automatic stopping of the active learning processing comprises:

matching the predicted label of each data element with each respective data element by the user continuously for more than a predetermined number of reviews.

15. A computer program product for outputting a data element to a user for an operation by the user to give a label to a plurality of data elements, the computer program product comprising a computer readable storage medium having program instructions embodied therewith, the program instructions executable by a computer to cause the computer to perform a method comprising:

employing classification learning of a model through active learning comprising:

selecting a data element from a plurality of data elements, wherein each data element of the plurality of data elements is a document, by first strategy, the first strategy being a strategy for selecting a data element which has been predicted with a low confidence level, the low confidence level at least partially subject to a prediction corresponding to one or more characteristics of the selected data element;

outputting the selected data element so as for a user to give a label to the selected data element, thereby generating a labeled data element;

learning the model with the labeled data element;

predicting, subject to the model learning, the label for each unlabeled data element;

assigning a confidence level of each prediction; and switching, automatically, between the first strategy and a second strategy depending on a progress degree of labeling by the user, the second strategy being a strategy for selecting a data element which has been predicted with a high confidence level, the high confidence level at least partially subject to the predicting; and stopping, automatically, at least partially subject to the predicting, all active learning processing comprising:

determining that a matching rate between data element predictions and user data element labeling is lower than a potential accuracy rate of labeling by the user.

16. The computer program product of claim 15, wherein the switching includes switching using a probability that the data element is selected by the first strategy, and the probability is set to have a property of becoming lower as the progress degree of the labeling by the user becomes higher.

17. The computer program product of claim 15, wherein the method further comprises:

propagating the label from one data element to another data element using a human-oriented similarity between the one data element and the another data element, the one data element being the data element which has been given the label, the another data element being the data element which has not been given the label.

18. The computer program product of claim 17, wherein the method further comprises:

constructing a graph including a plurality of nodes and a plurality of links each of which connects corresponding two nodes of the plurality of nodes, each of the plurality of nodes representing the data element, each of the plurality of links representing the human-oriented similarity between two data elements represented by the corresponding two nodes; and the propagating further includes specifying the human-oriented similarity by referring to the graph.

19. The computer program product of claim 15, wherein the automatic stopping of the active learning processing comprises:

matching the predicted label of each data element with each respective data element by the user continuously for more than a predetermined number of reviews.

* * * * *